United States Patent [19]
Yoshino et al.

[11] Patent Number: 5,319,290
[45] Date of Patent: Jun. 7, 1994

[54] MOTOR CONTROL CIRCUIT AND MOTOR DRIVE SYSTEM USING THE SAME

[75] Inventors: Motoyasu Yoshino; Fumihiko Ito, both of Kyoto, Japan

[73] Assignee: Rohm Co., Ltd., Kyoto, Japan

[21] Appl. No.: 998,058

[22] Filed: Dec. 29, 1992

[30] Foreign Application Priority Data

Jan. 10, 1992 [JP] Japan .................. 4-021813
Sep. 3, 1992 [JP] Japan .................. 4-260665

[51] Int. Cl.$^5$ ............................................. H02P 6/02
[52] U.S. Cl. ................................... 318/254; 318/138
[58] Field of Search ............... 318/798, 799, 805, 806, 318/138, 145, 254, 439, 459, 500; 388/928.1

[56] References Cited
U.S. PATENT DOCUMENTS

| | | | |
|---|---|---|---|
| 4,356,437 | 10/1982 | Saito et al. | 318/254 |
| 5,177,416 | 1/1993 | Inaji et al. | 318/254 |
| 5,182,499 | 1/1993 | Inaji et al. | 318/254 |
| 5,210,474 | 5/1993 | Oswald | 318/254 |
| 5,220,258 | 6/1993 | Hans et al. | 318/254 |

*Primary Examiner*—Bentsu Ro
*Attorney, Agent, or Firm*—Fay, Sharpe, Beall, Fagan, Minnich & McKee

[57] ABSTRACT

A motor control circuit includes a driver which amplifies a drive signal and outputs a drive current to a coil of a motor ; a detection circuit which detects a drive waveform of the drive current and outputs a detection pulse representing a rotating condition of the motor as a detection signal ; and a drive signal generating circuit which generates in response to the detection pulse a trapezoidal wave having a linear inclination at front and rear parts thereof as the drive signal.

5 Claims, 5 Drawing Sheets

MOTOR CONTROL CIRCUIT AND MOTOR DRIVE SYSTEM USING THE SAME

BACKGROUND OF THE INVENTION

1. Field of the Invention

The present invention relates to a motor control circuit and a motor drive system using the same and, more particularly, relates to a motor control circuit which smoothly controls rotation of a motor incorporated in electronic devices such as a floppy disk drive (FDD) and a hard disk drive (HDD), imaging devices such as a video camera and a video recording and reproducing device, and many kinds of office automation devices, and further, is suitable for making a portion a motor drive unit thin and small sized.

2. Description of Related Art

When roughly classified, methods of driving a motor and controlling the rotation thereof include a so-called open control method which controls motor rotation independently of actual motor rotating conditions, and a so-called feedback control method which detects motor rotating condition and controls the motor rotation based upon the detected signal.

Corresponding to methods of detecting the rotating condition, the feedback control methods include method of performing a control by detecting rotating condition of a rotor by means of a detection sensor such as a Hall element, and a method of performing a control by detecting a state of drive current and drive voltage, for example, constituting an input to the motor without using a sensor such as a Hall element.

The latter feedback motor control method is called a Hall-less motor method, because the method cases such sensors as a Hall element which are adapted to directly detect motor rotating condition. This Hall-less motor method is adapted to detect a state of, for example, drive current and drive voltage, which reflect a rotating condition of a motor, for example, an influence due to a counter-electromotive force from a coil of the motor, which is indirectly detected from the drive voltage. A detection signal representing the motor rotating condition is obtained therefrom.

FIG. 6 (a) shows a block diagram of a motor control circuit according to a conventional Hall-less motor method.

Herein, numerals 11, 12 and 13 are detection circuits which generate pulses having a pulse: width dependent upon a rotating condition, numeral 2 drive signal producing circuit which produces signal, numerals 31, 32 and 33 are drivers and numeral 4 is a three phase motor.

The drive signal producing circuit 20, which is usually composed of a logic circuit and, depending upon necessity, a phase shift circuit, produces pulse-like (including pulse-like waveforms in both positive and negative directions) driving signals Ud, Vd and Wd response to the detection signals Up, Vp, Wp, having different respective phases, which serve as models of output waveform to the motor 40.

The drive signals Ud, Vd and Wd are respectively applied to the drivers 31, 32 and 33 and are amplified an amplifier in the respective drivers to produce output currents Iu, Iv and Iw having waveforms according those o f the drive signals Ud, Vd and Wd . These currents are fed to respective coils in a star connection to drive and rotate the motor 40. A waveform of the output current Iu is illustrated in FIG. 6 (b) as a representative of output currents Iu, Iv and Iw. Phases of the output currents Iu, Iv and Iw deviate successively by 120° from each other. However, the actual current flowing through the motor coil varies in relation to a load applied thereto.

At the output sides of the drivers 31, 32 and 33 output voltages Vu, Vv and Vw are generated depending upon the output currents Iu, Iv and Iw. These output voltages vary dependent upon the variation of a counter-electromotive force generated in the coils in response to a motor rotating condition. Accordingly, these voltages reflect a rotating condition of the motor 40.

Therefore, using comparators for the detection circuits 11, 12 and 13, the output voltages from the respective drivers 31, 32 and 33 are compared with a neutral point voltage at the star connected coils . Thereby, a rotating condition of the motor 40 can be detected in a form of a pulse width. The detection results are respectively outputted from the detection circuits 11, 12 and 13 as the detection pulses Up, Vp and Wp of which leading and trailing edges are determined in response to the rotating condition. In case of three phase motor control, the phases of the detection pulses usually deviate by 120°, from each other and the duty ratio of the respective pulses is about 50% .

Based upon these detection pulses Up, Vp and Wp the above drive signals Ud, Vd and Wd, which reflect a rotating condition of the motor 40, are produced through logical processing, for example, by the drive signal producing circuit 20 .

Thereby, control loops starting from the outputs of the drivers and returning to the inputs of the drivers via the detection circuits are formed. With the function of these feedback loops a control in response to a rotating condition of the motor 40 is carried out and the rotating speed thereof is maintained at a predetermined speed.

In this kind of conventional motor control circuit the detection signal is obtained in a form of a pulse and logical processing is applied to the detection pulse to produce a pulse-like drive signal .

However, since the waveform of the drive signal which serves as a model waveform of a drive current or drive voltage for the motor is one as illustrated in FIG. 6 (b) , the waveform of a drive current or drive voltage for the motor is also a pulse shape. Therefore, the motor drive torque is also generated in a pulsing manner, and a sufficiently smooth rotating condition of the motor cannot be obtained.

On the other hand, triggered by an improvement such as in recording density on a recording medium to and from which information is written and read in the field of HDD and FDD, the motor which controls the rotation of the medium is required to be controlled to rotate smoothly in accordance with the improvement in recording density The same tendency exists in such fields as video devices, wherein a recording density on a magnetic tape has been also improved such that it is desirable to rotate a motor as smoothly as possible.

SUMMARY OF THE INVENTION

A control which achieves a smooth rotation of a motor can be obtained by controlling a motor rotation by means of a so-called analogue drive wherein a rotating phase of the motor is detected with a sensor such as a Hall element to obtain a detection signal in a sinusoidal waveform representing the rotating phase and a drive signal is produced in an analogue manner in response to the detected signal.

However, the Hall element constitutes a past which has to be equipped externally with respect to a motor control circuit which has been constructed in an IC form, and further such as a biasing circuit and an adjustment circuit for the Hall element are required as externally equipped parts. On the other hand, in order to meet a requirement of small-sized office automation device, small-sizing and thin-sizing of the motor main body has been advancing; therefore it has become difficult to obtain a space for mounting a sensor such as the Hall element. Further, it is necessary to add several kinds of auxiliary circuits and adjustment work for the operation of the Hall element as explained above, and still further because of characteristic dispersion of the Hall elements it is necessary to select a Hall element having a proper characteristic.

Accordingly, an object of the present invention is to provide a motor control circuit which performs smooth rotation and control of a motor without using a sensor which detects a rotating condition of the motor.

Another object of the present invention is provide a motor control circuit which is suitable for small-sizing and thin-sizing thereof.

Still another object of the present invention is to provide a motor drive system which is suitable for small-sizing and thin-sizing thereof.

The constitution of the motor control circuit according to the present invention which achieves the above objects comprises a driver which amplifies a drive signal and outputs a drive current to a coil of the motor, a detection circuit which detects a waveform of the drive current and outputs a detection pulse representing a rotating condition of the motor as detection signal, and a drive signal generating circuit which generates in response to the detection pulse a trapezoidal wave having a linear inclination at front and rear ends thereof as the drive signal.

Namely, since after the detection signal is shaped into a pulse form a trapezoidal wave having a linear inclination at the front and rear ends is produced from the drive signal generating circuit, a drive output having a gentle inclination part at the front and rear ends approximate to a sinusoidal waveform is generated. Thereby, depending upon a gentle variation of the drive signal the motor drive current flowing through the motor coil also varies gently, and a rotating condition of the motor is smoothed.

Accordingly, when a motor is driven with the above motor control circuit, the motor is driven to rotate smoothly without using a Hall element.

Further, the inclination parts at front and real ends in the produced trapezoidal wave are fashioned in line with substantially a constant inclination by charging or discharging at a constant current to and from a capacitor in a circuit including a constant current circuit and a switching circuit.

Therefore, with the motor control circuit having the constitution according to the present invention, the motor is rotated smoothly even though the control circuit is constituted according to a Hall-less method which does not use a Hall element. Further, in the present invention there is no need to mount the Hall element, and thus the present invention contributes to reducing the size of devices to which the present control circuit is incorporated, and to make a motor incorporating the motor control circuit thin. Still further, the auxiliary circuits and adjustment work which are necessitated connection with the use of a Hall element are eliminated.

DESCRIPTION OF THE PREFERRED EMBODIMENTS

Figure 1:
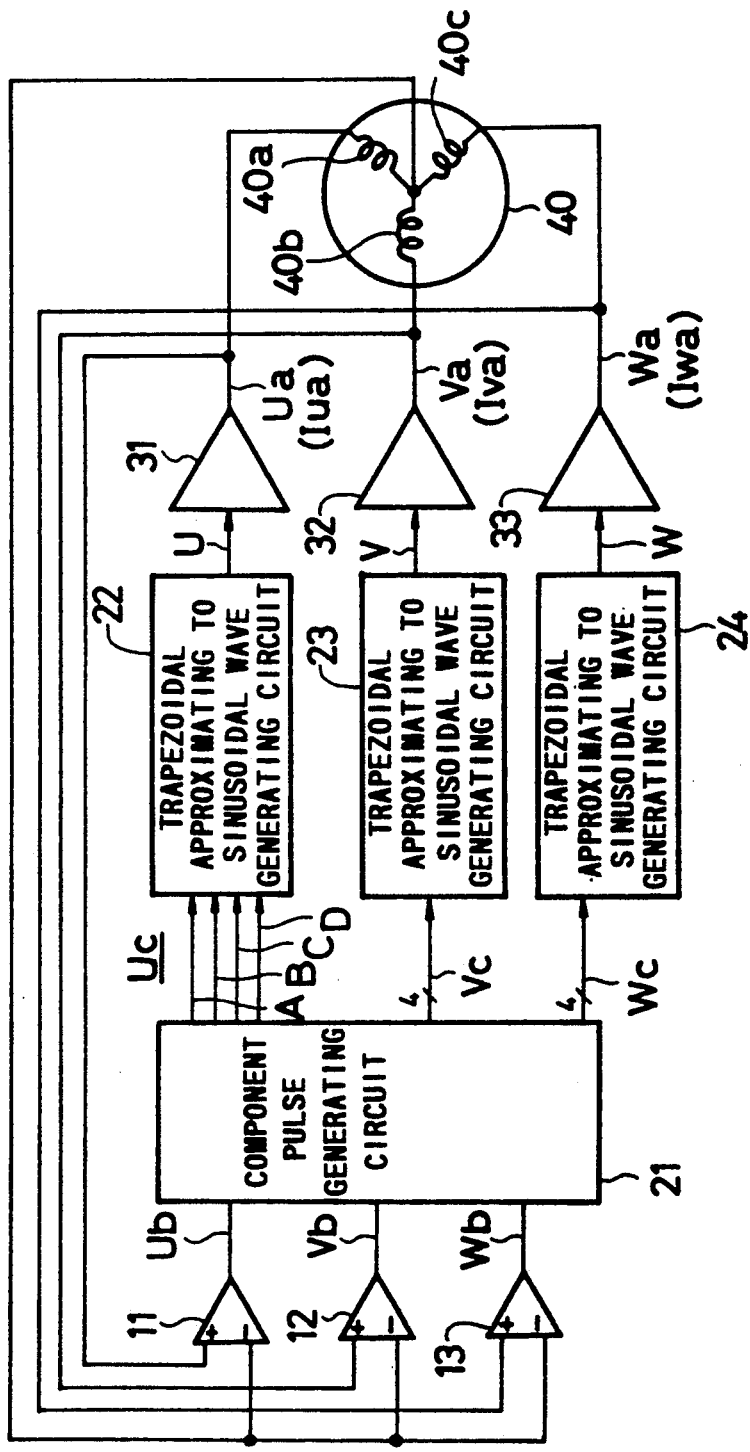
FIG. 1 is a block diagram of a motor control circuit for controlling a three phase motor, which is one embodiment of motor control circuits according to the constitution of the present invention.
Figure 6A:
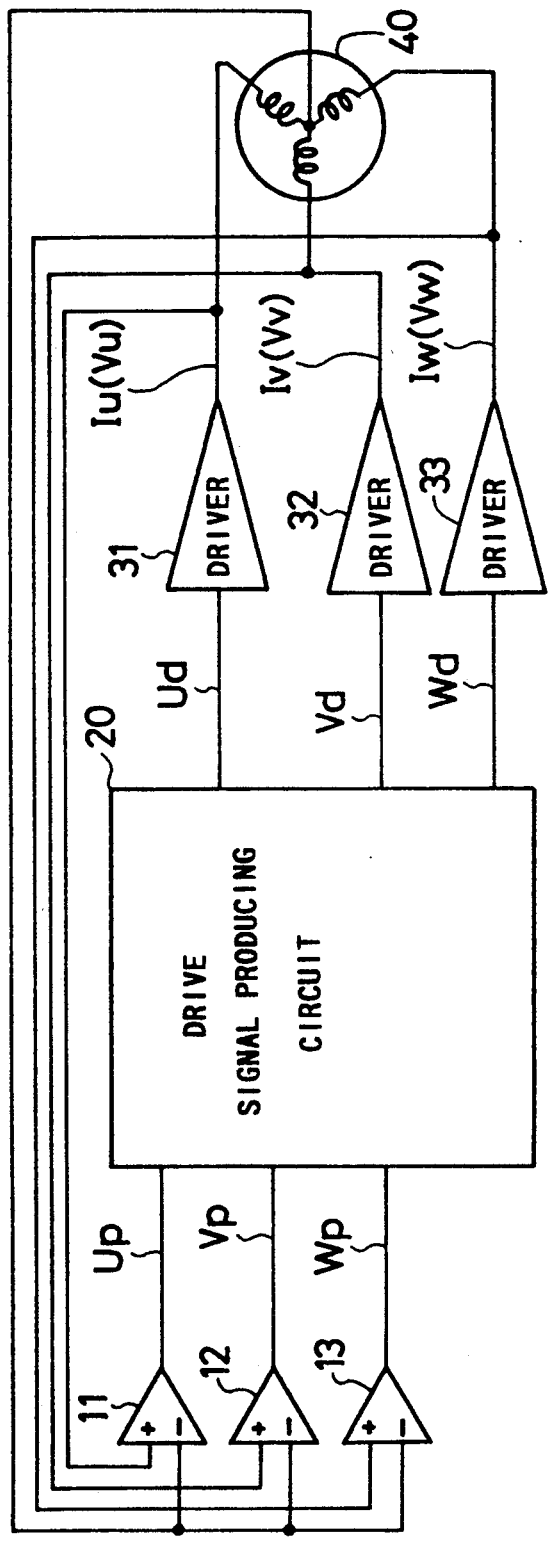
FIG. 6 (a) is a block diagram of a conventional three phase motor control circuit, and FIG. 6 (b) is a waveform diagram of an output current of the circuit in FIG. 6 (a).
Figure 6B:

In the motor control circuit in FIG. 1, the same constitutional elements as those shown in FIG. 6 are designated with the same reference numerals or symbols and the explanation thereof is omitted. Numeral 21 is a component pulse generating circuit for forming a trapezoidal wave which generates a pulse group constituting components for the trapezoidal wave. Numerals 22, 23 and 24 are trapezoidal wave generating circuits that generate output signals approximating sinusoidal waves. Numerals 40a, 40b and 40c are coils in the motor 40.

Drive signals U, V and W inputted to the drivers 31, 32 and 33 are produced by the component pulse generating circuit 21 and the trapezoidal generating circuits 22, 23 and 24 based upon detection pulses Ub, Vb and Wb from the detection circuits 11, 12 and 13.

The component pulse generating circuit 21, for example, applies logical processing to the detection pulses Ub, Vb and Wb (which is explained later in detail ) by making use of an AND gate and a NOT gate, and generates based upon the detection pulses Ub, Vb and three sets of four pulses having different respective generating phases and pulse widths which correspond to three trapezoidal waves having phases that differ, respectively by 120° and which are produced in the subsequent stage. The four pulses in respective sets are generally designated here as component pulse groups Uc, Vc and Wc for forming the trapezoidal waves, are depicted and representative waveforms A, B, C and D in the component pulse group Uc in FIG. 3.

The component pulse group Uc for forming trapezoidal wave includes components for forming a current waveform fed to the coil 40a, the component pulse group Vc includes components for forming a current waveform fed to the coil 40b, and the component pulse group Wc includes components for forming a current waveform fed to the coil 40c. These component pulse groups only differ in their phases by 120° from each other but their processing in subsequent stages is identical . Therefore, in the following details thereof are explained only is explained in connection with the component pulse group Uc but, where necessary the other component pulse groups Vc and Wc will be explained.

Further, the detection pulses Ub, Vb and Wb shaped into a pulse form contain no substantial distortions their signal waveforms due to influences from such as the motor; therefore the component pulse groups Uc, Vc and Wc produced therefrom al so contain substantially no influences due to distortions in the signal waveforms.

The component pulses A, B, C and D for forming the trapezoidal wave are pulses which do not overlap each other and are outputted in the named order. The trapezoidal wave generating circuit 22 which receives these component pulses A, B, C and D outputs a voltage waveform approximating to a sinusoidal waveform which varies with reference to ½ of a source voltage Vcc illustrated by a waveform U in FIG. 3. Among the component pulse wave forms, the component pulses A and C are used for forming a first trapezoidal wave corresponding to the positive side of a sinusoidal waveform and the component pulses B and D are used for forming a second trapezoidal wave corresponding to the negative side of a sinusoidal waveform. These trapezoidal waves are for generating a drive current for the motor in two directions. When the motor is designed drive in one direction, either the positive or the negative side trapezoidal wave is enough. Further, the relationship and function of the component pulses in the component pulse groups Vc and Wc are identical with those in component pulse group Uc except for the difference in their phases.

The trapezoidal wave generating circuit 22 at first receives the component pulse A and produces a positive linear inclination part (voltage) in a former half of the trapezoidal wave to be produced, and upon receipt of the component pulse B produces a negative inclination part (voltage) in a latter half thereof. In the interval between these inclination parts a flat waveform in the intermediate portion is produced while maintaining the voltage constant. Thus, a positive side of a trapezoidal wave approximating to a sinusoidal wave is formed and outputted. Subsequently, upon receipt of the component pulse C a negative inclination part is produced, and upon receipt of the component pulse D a positive inclination part is produced. Then flat waveform portions for the parts other than the inclination parts are produced. Thus a negative side of a trapezoidal wave approximating to a sinusoidal wave is formed and outputted.

A group of component pulses A, B, C and D thus are at first produced and based upon these pulses a drive signal U for one cycle having a pair of positive and negative side trapezoidal waves is produced. The production process of the drive signals V ant W identical to that of the drive signal U explained above except for the difference in their phases.

The driver 31 operates as an output amplifier in motor drive stage. The driver 31 outputs a drive current to the coil 40a and further sinks a drive current flowing out from the coil 40a, namely performs an operation of bidirectional drive. Therefore, the driver 31 amplifies the drive signal U, produces a current Iua corresponding to the drive signal U with an output voltage Ua and outputs the same to the coil 40a.

Similarly, the driver 32, upon receipt of the drive signal V which is produced from the component pulse group Va by the trapezoidal wave generating circuit 23, outputs an output voltage Va (current: Iva) to the coil 40b, and the driver 33, upon receipt of the drive signal W which is produced from the component pulse group Wc by the trapezoidal wave generating circuit 24, outputs an output voltage Wa (current Iwa) to the coil 40c.

Figure 3:
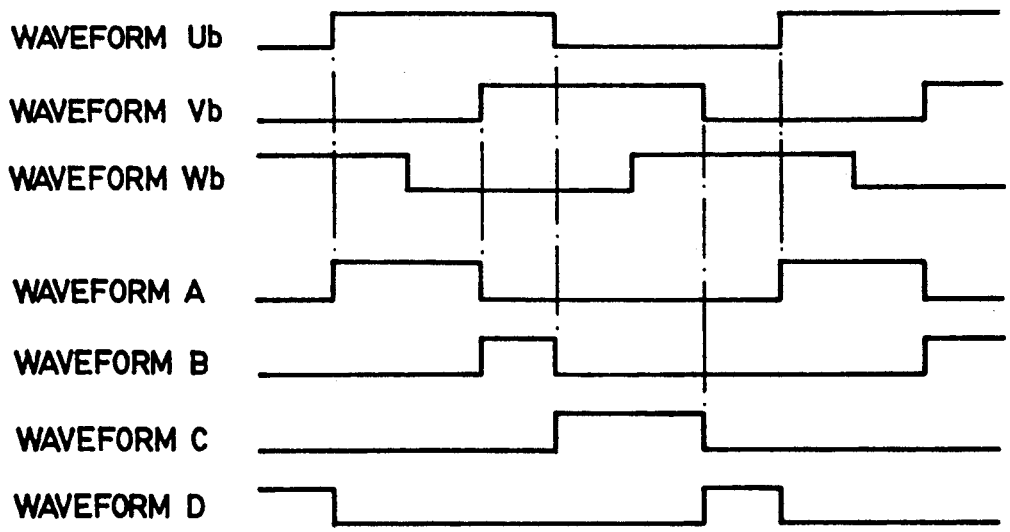
FIG. 3 shown waveform diagrams of signals at several portions of the motor control circuit of FIG. 1.

The currents Iua, Ira and Iwa flowing through the coils 40a, 40b and 40c vary more gently than the trapezoidal wave varying in a positive and negative side as illustrated by waveform U in FIG. 3 because of a transient characteristic of the currents flowing through the coils, and the motor is driven by these currents. As a result, the motor 40 rotates smoothly.

Now, productions of the component pulses A, B, C and D in the component pulse generating circuit 21 is explained in detail with reference to FIG. 3.

The detection pulses Ub, Vb and Wb have a duration of about 50% here except for transient conditions and a phase difference of 120° with respect to each other (see waveforms U, V and W in FIG. 3).

By performing AND operations of the detection pulses Ub, Vb and Wb or inverted signals of these pulses in the component pulse generating circuit 21 the respective component pulses are produced. For example, by performing AND of the signal of the detection pulse Ub and the inverted signal of the detection pulse Vb the component pulse A having about ⅔ width of the HIGH level (hereinafter abbreviated as "H") portion in the detection pulse Ub is produced. By taking AND of the signal of the detection pulse Ub and the signal of the detection pulse Vb the component pulse B having about ⅓ the width of the "H" portion of the detection pulse Ub at the latter part thereof is produced.

Similarly, by taking AND of the signal of the detection pulse Ub and the signal of the detection pulse Vb the component pulse C having about ⅔ the width of the LOW level (hereinafter abbreviated as "L") portion in the detection pulse Ub is produced. By taking AND of the inverted signal of the detection pulse Ub and the inverted signal of the detection pulse Vb the component pulse D having about ⅓ the width of the "L" portion of the detection pulse Ub at the latter part thereof is produced.

Figure 2:
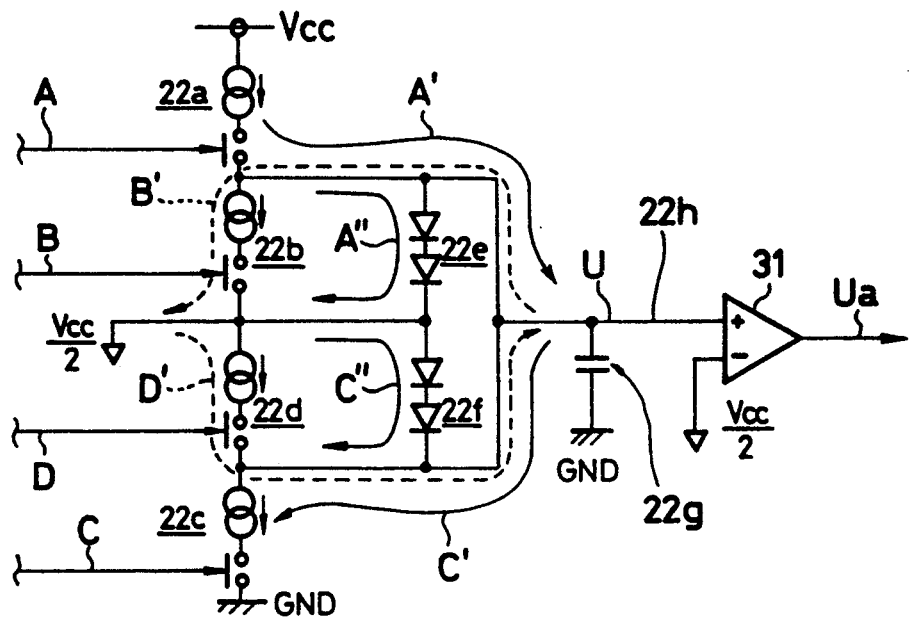
FIG. 2 is a block diagram of a specific example of trapezoidal wave approximating to a sinusoidal wave generating circuit shown in FIG. 1.

Now, the trapezoidal wave generating circuit 22 explained with reference to FIG. 2. The trapezoidal wave generating circuit 22 is a circuit which charities and discharges a capacitor with a constant current. The trapezoidal wave generating circuit 22 is composed of circuits 22a, 22b, 22c and 22d, each formed of a series connection of a constant current circuit and a switching circuit (hereinafter referenced together as a constant current and switching circuit), diode circuits 22e and 22f for voltage level setting formed of two serially connected diodes (hereinafter called as diode circuit), and capacitor 22g.

The constant current and switching circuit 22a is connected between the power source Vcc and an output line 22h which outputs the drive current U, and when the switching circuit therein receives the component pulse A the constant current and switching circuit 22a rendered conductive and outputs either a constant current A' or A" from the power source Vcc via the constant current source.

The constant current and switching circuit 22b is connected between a bias line (Vcc/2) which is kept at a midpoint potential of the power source voltage Vcc and the ground line (GND) and the output line 22h, and when the switching circuit therein receives the component pulse B, the constant current and switching circuit 22b is rendered conductive and discharges the capacitor 22g at a constant current B'.

The constant current and switching circuit 22c is connected between GND and the output line 22h, and when the switching circuit receives the component pulse C the constant current and switching circuit 22c is rendered conductive and discharges the capacitor 22g at a constant current either of C' or C".

The constant current and switching circuit 22d is connected between the bias line (Vcc/2) and the output line 22h, and when the switching circuit receives the component pulse D, the constant current and switching circuit 22d is rendered conductive and output a constant charging current D' from the bias line (Vcc/2) to the capacitor 22g.

The diode circuit 22e is connected in parallel to the constant current and switching circuit 22b, and the diode circuit 22f is connected in parallel to the constant current and switching circuit 22d.

The capacitor 22g is connected between the output line 22h and GND and is charged or discharged at constant currents A', B', C' and D' to determine the inclination portions in the waveform for the drive signal U in a voltage signal.

In the trapezoidal wave generating circuit 22 thus constituted, when at first the component pulse A received the capacitor 22g is charged with the constant current A' via the constant current and switching circuit 22a, and the positive inclination portion in the voltage waveform for the drive signal U is formed (see A' on waveform U in FIG. 3). Thereafter, when the voltage the drive signal U reaches to Vcc/2+2Vf (Vf=forward voltage of a diode), the constant current A' is reduced by the constant current A" flowing in the diode circuit 22e and the voltage waveform for the drive signal U is flattened (see A" on waveform U in FIG. 3). With the provision of the diode circuit 22e, even if the pulse width of the component pulse A is not determined, the interval of the inclination portion of the trapezoidal wave is kept constant and the voltage of the flattened portion is correctly controlled. Further, if the width of the component pulse A is determined correctly so as to correspond to the interval of the inclination portion, the diode circuit 22e can be omitted.

Subsequently, when the component pulse B received, the capacitor 22g is discharged at the constant current B' via the constant current and switching circuit 22b and the negative inclination portion in the voltage waveform for the drive signal U formed (see B' portion on waveform U in FIG. 3). Thereafter, when the voltage of the drive signal reaches Vcc/2, the potentials at both ends of the constant current and switching circuit 22b are rendered equal and a voltage for driving the constant current B' disappears, and thereby the voltage waveform for the drive signal U is flattened (see B" portion on waveform U in FIG. 3).

Accordingly, one trapezoidal wave is formed above the reference voltage Vcc/2, i.e. on the positive side.

Similarly, when the component pulse C is received, the negative inclination portion in the voltage waveform for the drive signal U is formed with the constant current and switching circuit 22c and the capacitor 22g (see C' portion on waveform U in FIG. 3), and thereafter the flattened portion is formed (see C" on waveform U in FIG. 3). Further, when the component pulse D is received, the positive inclination portion in the voltage waveform for the drive signal U is formed by the discharge via the constant current and switching circuit 22d (see D' portion on waveform U in FIG. 3), and thereafter the flattened portion is formed (see D" portion on waveform in FIG. 3). Thereby, another trapezoidal wave is formed below the reference voltage Vcc/2, i.e., on the negative side.

Herein, the drive signal U is produced by charging or discharging the capacitor by means of the constant current circuit and the switching circuit, and the positive inclination portion (the increasing tendency in the former half) and the negative inclination portion (the decreasing tendency in the latter half) in the trapezoidal wave vary linearly at an equal rate; therefore the resultant voltage waveform approximates a sinusoidal waveform.

Accordingly, with a pair of positive and negative trapezoidal waves each being formed of linear inclination portions at front and rear portions the drive signal U corresponding to one cycle having a waveform approximating to a sinusoidal waveform is produced.

Since the drive signal U is a signal component which uses voltage Vcc/2 as the reference voltage, the driver 31 amplifies in response thereto the difference between the drive signal U and the reference voltage and outputs the bidirectional current Ua.

Figure 4:
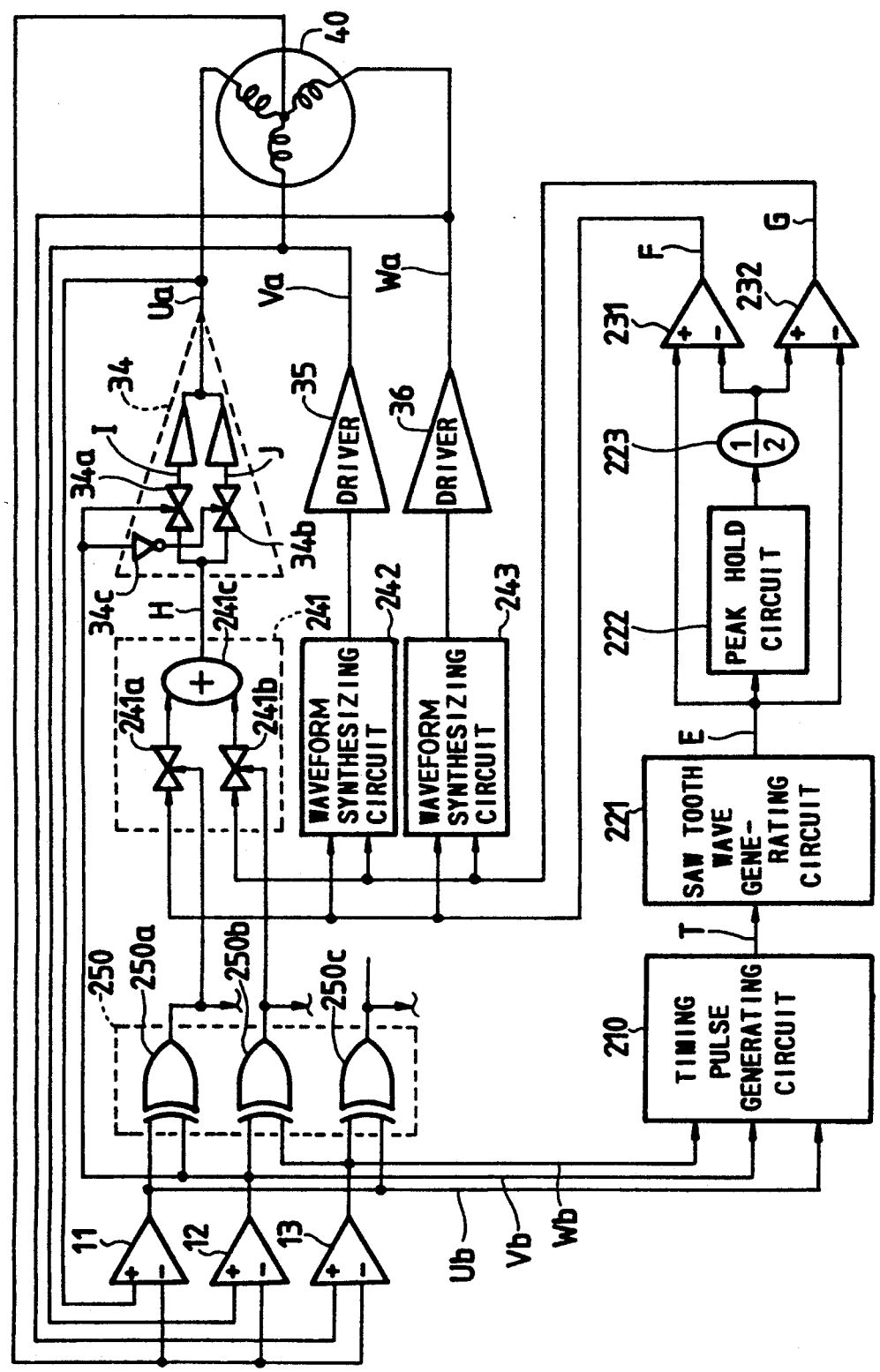
FIG. 4 is a block diagram of a motor control circuit for controlling a three phase motor, which is another embodiment of motor control circuits according to the present invention.

The motor control circuit shown in FIG. 4 is designed to produce a trapezoidal wave approximating to a sinusoidal wave by making use of a saw tooth wave generating circuit and by successively generating upper and lower trapezoidal waves.

Numeral 210 is a timing pulse generating circuit, numeral 221 is a saw tooth wave generating circuit, numeral 222 is a peak hold circuit, numeral 223 is a voltage dividing circuit which generates a voltage divided into ½, numerals 231 and 232 are difference signal generating circuits, numerals 241, 242 and 243 are waveform synthesizing circuits, and numeral is selection signal generating circuit. These circuits correspond to the component pulse generating circuit 21 and the trapezoidal wave generating circuits 22, 23 and 24 as shown in FIG. 1.

Figure 5:
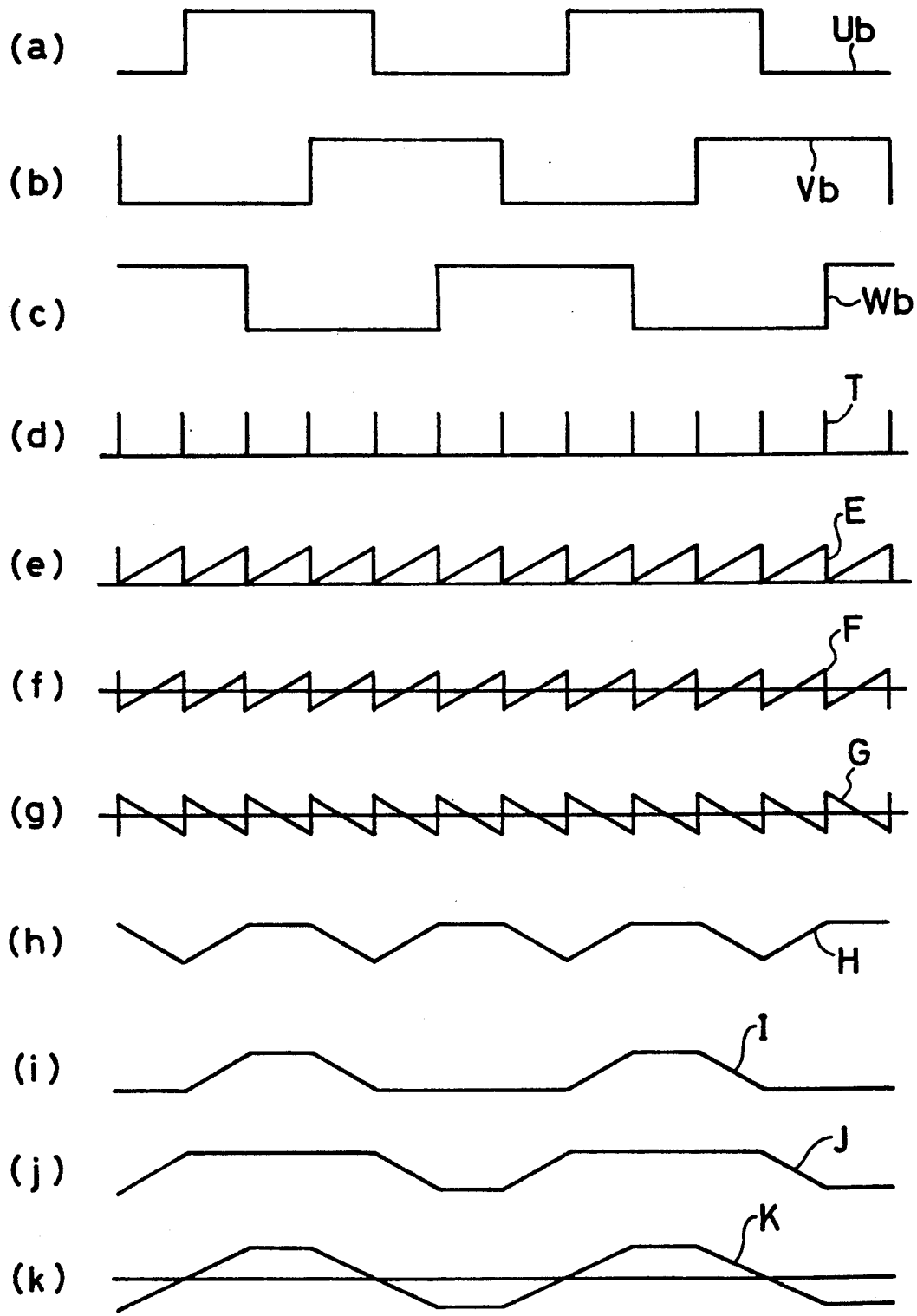
FIG. 5 is waveform diagrams of signals at several portions of the motor control circuit of FIG. 4.

The timing pulse generating circuit 210 receives detection pulses Ub, Vb and Wb, performs logical processing on these signals and generates timing pulses T at every timing when any of these pulses is inverted (see the waveform in FIG. 5 (d)). Since the signals Ub, and Uc have a phase difference of 120° with respect to each other, the timing pulses T are generated at every phase angle of 60°.

The saw tooth wave generating circuit 221 is reset to a level of "0" at every timing when the timing pulses T are received and thereafter generates a saw tooth wave E in voltage form of which amplitude increases with a predetermined inclination (see waveform in FIG. 5 (e)). The saw tooth wave generating circuit 221 is constituted in the same manner as in FIG. 2 by a circuit which is designed to change, and discharge a capacitor by making use of a constant current circuit and a switching circuit.

The peak hold circuit 222 receives the saw tooth wave E, holds a peak value of the saw tooth wave E immediately before being reset and outputs the same Since the inclination of the saw tooth wave E constant, the peak value reflects a rotating speed of the motor 40. The value is proportional to a time required to rotate the motor 40 by 60°.

The voltage dividing circuit 223, for example, constituted by a resistor-type voltage dividing circuit The voltage dividing circuit divides the peak vague held and outputted into ½ and generates a center value in voltage form of ½ of the peak value. The center value is also influenced by a rotating speed of the motor 40, and corresponds to a time which required to rotate the motor 40 by 30°.

The difference signal generating circuit 231 constituted by an operational amplifier, and receives the divided voltage and the saw tooth wave E and generates difference signal which is obtained by subtracting the central value from the value of the saw tooth wave The difference signal shows an equivalent waveform as the saw tooth wave E and has a positive inclination. Since the above central value corresponds to a time which required to rotate the motor 40 by 30°, the difference signal represents a saw tooth wave F which oscillates in positive and negative directions with substantially equal amplitudes with reference to the central value (see waveform F in FIG. 5 (f)).

The difference signal generating circuit 232 constituted by an operational amplifier, and receives the divided voltage and the saw tooth wave E and generates a difference signal which is obtained by subtracting the value of the saw tooth wave E from the central value. The difference signal shows an equivalent waveform as the inverted saw tooth wave E, has a negative inclination, and represents a saw tooth wave G which oscillates in positive and negative direction with substantially equal amplitude with reference to the central value (see waveform G in FIG. 5 (g)).

Since the saw tooth waves F and G are difference signals produced by the saw tooth wave E and the central value, the saw tooth waves oscillate in positive and negative directions with substantially equal amplitude regardless of the rotating speed of the motor 40. Moreover, one saw tooth portion corresponds to a time which is required to rotate the motor 40 by 60° and the polarity thereof alternates at the midpoint thereof, i.e. at rotating phase angles of 30°.

The waveform synthesizing circuit 241 is composed of switching circuits 241a and 241b, and an adding circuit 241c. The switching circuit 241a receives the saw tooth wave F and outputs the same to the adding circuit 241c. The switching circuit 241b receives the saw tooth wave and outputs the same to the adding circuit 241c. The adding circuit 241c adds and synthesizes the received waveforms and outputs the same to the driver 34. The respective switching circuits 241a and 241b are "ON/OFF" controlled upon receipt of a pulse signal respectively from EXORs 250a and 250b in the selection signal generating circuit 250.

The selection signal generating circuit 250 composed of the EXORs 250a, 250b and 250c, performs logical processing on the detection pulses Ub, Vb and Wb with the EXORs and outputs pulses for the respective phases which select the saw tooth waves F and G as selection signals. The waveform synthesizing circuit 241 outputs an output trapezoidal wave according to the selection signals. The waveform synthesizing circuit 241 selects the saw tooth wave F as an input signal at the timing of the leading edge of the trapezoidal wave to be outputted and outputs the same as an output signal U, selects both the saw tooth wave F having positive inclination and the saw tooth wave G having negative inclination as input signals at the timing when the upper side of the output trapezoidal wave is to be flattened cancels out the inclinations by superposing both and outputs the same as the output signal U, and further selects the saw tooth wave G as an input signal at the timing of the trailing edge of the output trapezoidal wave and outputs the same as the output signal U. In the present embodiment, the waveform H as illustrated FIG. 5 (h) has no lower side flattened portions; therefore simultaneous selection of both saw tooth waves F and G OCCURS.

The selection signal for selecting the saw tooth waves F and G is produced from the detection pulses Vb and Wb through logical processing in the selection signal generating circuit 250. In the present embodiment, an EXOR circuit is simply used as the logical processing circuit. Further the selection signal of the saw tooth wave F for the waveform synthesizing circuit 241 is produced by performing EXOR on the signals Ub and Vb as illustrated in FIG. 5 (a) and FIG. 5 (b). The produced selection signal shows a waveform corresponding to the summed signal of the waveform A and the waveform B as illustrated in FIG. 3. The selection signal of the saw tooth wave G for the waveform synthesizing circuit 241 produced by performing EXOR on the signals Vb and Wb illustrated in FIG. 5 (b) and FIG. 5 (c). The produced selection signal shows a waveform corresponding to the summed signal of the waveform A and the waveform C but shifted to the right by 120°.

As a result, the waveform of the drive signal U is formed into a continuous trapezoidal wave corresponding to a time required to rotate the motor 40 by 180° (see waveform H shown in FIG. 5 (h)).

The waveform synthesizing circuits 242 and 243 also produce other driving signals having phase differences of 120° with respect to each other according to in the same operation as explained above.

The driver 34 includes switching circuits 34a and 34b, and an inverter 34c other than the output amplifying circuit. The switching circuit 34a is "ON/OFF" controlled by the detection pulse Vb, and the switching circuit 34b receives the detection pulse Vb via the inverter 34c and is "ON/OFF" controlled at the inverted phase with the switching circuit 34a. These switching circuits 34a and 34b receive the drive signal H, develop through their respective "ON/OFF" operations into an outgoing side waveform signal I (see waveform I in FIG. 5 (i)) and into recirculating side waveform signal J (see waveform J in FIG. 5 (j)) and output the same to the output amplifying circuit. Thereby, a drive signal Ua having the respective directions is produced. The drive signal Ua shows a continuous trapezoidal wave following the waveform of the drive signal K (see waveform K FIG. 5 (K)) regardless of the rotating speed of the motor 40. The waveform of the drive current Ua is further approximated to a sinusoidal waveform different from the trapezoidal waveform U illustrated in FIG. 3 wherein the portions between positive and negative side trapezoidal waves are temporarily flattened at the voltage of Vcc/2.

The drivers 35 and 36 operates in the same manner as the driver 34 except that the phases of the signals dealt are different by 120° with respect to each other.

Accordingly, the motor 40, which is driven to, rotate by these drive currents represented by the continued trapezoidal waves, rotates smoothly because the drive torque varies gently.

Further, since the saw tooth wave generating circuit 221, the peak hold circuits 222 and 223, and the difference signal generating circuits 231 and 232 as a whole generate the two saw tooth waves F and G, the circuits as a while constitute a saw tooth wave generating circuit.

Hereinabove, although embodiments are explained wherein the waveforms of drive currents for a motor follow waveforms of drive signals, another embodiment wherein waveforms of drive voltages for a motor follow waveforms of drive signals can be realized by substantially the same constitution except for the constitution of the drivers. Further, the waveform the drive currents for the motor can be detected, other than the output voltage from the drivers, from any one a part of the output voltage, the output current, a part of the output current, a voltage generated in the motor coil, a part of the generated voltage, the output current therefrom and a part of the output current particular, the drive current, for example, can detected in a form of a voltage signal by inserting resistor in series with the motor coil.

Further, the detection circuits 11, 12 and 13, and the circuits in subsequent stages may usually connected to external signals from such as a start circuit and a step feed circuit and such as a selection circuit therefor. However, these are not related to normal rotating state of the motor, therefore the illustration thereof is omitted.

Further, the linear inclined portions formed at front and rear parts in the trapezoidal wave can produced by making use of a counter and a D/A converting circuit by counting clock pulses with the counter, incrementing or decrementing successively the counted value and converting the counted value with the D/A converting circuit.

We claim:

1. A motor control circuit which detects a rotating condition of a motor, produces a drive signal having a signal waveform for driving the motor in response to a detection signal and drives the motor dependent upon the drive signal, comprising:
   a driver which amplifies the drive signal and outputs a drive current to a coil of said motor;
   a detection circuit which detects a state of a drive waveform of the drive current and outputs a detection pulse representing a rotating condition of said motor as the detection signal; and
   a drive signal generating circuit which generates in response to the detection pulse a trapezoidal wave having a linear inclination at front and rear parts thereof as the drive signal;
   wherein the state of the drive waveform is detected in a form of any of an output voltage of said driver, a part of the output voltage, an output current of said driver, a part of the output current, a voltage generated in the coil, a part of the generated voltage, an output current from the coil and a part of the output current from the coil;
   wherein said motor is a three phase motor, three of the detection pulses corresponding to the respective phases for said three phase motor are generated when the drive waveform exceeds a predetermined reference value, said drive signal generating circuit comprises a logical processing circuit which receives the three detection pulses, performs logical processing thereon and generates for the respective phases a plurality of pulses for generating the trapezoidal wave, and trapezoidal wave generating circuits provided for the respective phases which respectively receive the plurality of pulses for the respective phase from said logical processing circuit and generate the trapezoidal wave for the respective phases;
   wherein the plurality of the pulses include first and second pulses each having a predetermined phase and width but different in phase with respect to each other, and watch said trapezoidal wave generating circuit generates a signal in which the front inclined portion of the trapezoidal wave is formed upon receipt of the first pulse, the rear inclined portion of the trapezoidal wave is formed upon receipt of the second pulse and the portions other than the inclined portions thereof are flattened, and outputs the signal as the drive signal; and
   wherein said trapezoidal wave generating circuit includes a constant current circuit, a switching circuit and a capacitor, said capacitor is charged from said constant current circuit via said switching circuit in response to the first pulse, and said capacitor is discharged from said constant current circuit via said switching circuit in response to the second pulse.

2. A motor control circuit according to claim 1, wherein said constant current circuit includes a first and second constant current circuit, said switching circuit includes a first and second switching circuit, said first constant current circuit and said first switching circuit are connected in series between a first reference potential line and an output line of the drive signal generating circuit, said second constant current circuit and said second switching circuit are connected in series between a second reference potential line and the output line of the drive signal generating circuit, said capacitor is connected between a third reference circuit, said capacitor is connected between a drive signal generating circuit, when the first pulse is received, said first switching circuit is rendered conductive and said capacitor is charged, and when the second pulse is received, said second switching circuit is rendered conductive and said capacitor is discharged, and said drive signal generating circuit generates alternatively the trapezoidal wave in positive and negative polarities for the respective phases.

3. A motor control circuit in which a pulse is generated as a detection pulse in response to a drive waveform of a drive circuit outputted for driving a motor, and a drive signal is produced in response to the detection pulse and is amplified to be outputted as the drive current, comprising:
   a timing pulse generating circuit which generates a timing pulse in response to an inverting timing of the detection pulse;
   a saw tooth wave generating circuit which generates a first saw tooth wave of which level in either voltage or current is reset at a predetermined value at a timing of the timing pulse and thereafter varies at a predetermined inclination, in synchronism wit the first saw tooth wave, a second saw tooth wave having a positive polarity inclination of equal absolute value as the predetermined inclination, and using as a reference level a center value between the peak value of said first saw tooth wave immediately before said first saw tooth wave is reset and the reset value, and in synchronism with the first saw tooth wave a third saw tooth wave having a negative polarity inclination of equal absolution value as the predetermined inclination and using the central value as a reference level; and
   a waveform synthesizing circuit which synthesizes a trapezoidal wave by selecting the second saw tooth wave for the front inclination portion of the trapezoidal wave to be generated, by selecting both the second saw tooth wave and the third saw tooth wave or by selecting neither the second saw tooth wave nor the third saw tooth wave for the flattened portion of the trapezoidal wave, and by selecting the third saw tooth wave for the rear inclination portion of the trapezoidal wave, and outputs the trapezoidal wave as the drive signal.

4. A motor control circuit according to claim 3, wherein said motor is a three phase motor, the drive waveform varies in positive and negative direction with respect to the reference level and three of the detection pulses corresponding to the respective phases for said three phase motor are generated when the drive waveform exceeds a predetermined reference value.

5. A motor drive system which detects a rotating condition of a motor, produces a drive signal having a signal waveform for driving the motor in response to a detection signal and drives the motor dependent upon the drive signal, comprising:

said motor;

a driver which amplifies the drive signal and outputs a drive current to a coil of said motor;

a detection circuit which detects a state of a drive waveform of the drive current and outputs a detection pulse representing a rotating condition of said motor as the detection signal; and a drive signal generating circuit which generates in response to the detection pulse a trapezoidal wave having a linear inclination at front and rear parts thereof as the drive signal;

wherein the state of the drive waveform is detected in a form of any of an output voltage of said driver, a part of the output voltage, an output current of said driver, a part of the output current, a voltage generated in the coil, a part of the generated voltage, an output current from the coil and a part of the output current from the coil;

wherein said motor is a three phase motor, three of the detection pulses corresponding to the respective phases for said three phase motor are generated when the drive waveform exceeds a predetermined reference value, said drive signal generating circuit comprises a logical processing circuit which receives the three detection pulses, performs logical processing thereon and generates for the respective phase a a plurality of pulses for generating the trapezoidal wave, and trapezoidal wave generating circuits provided for the respective phases which respectively receive the plurality of pulses for the respective phases from said logical processing circuit and generate the trapezoidal wave for the respective phases;

wherein the plurality of the pulses include first and second pulses each having a predetermined phase and width but different in phase with respect to each other, and each said trapezoidal wave generating circuit generates a signal in which the front inclined portion of the trapezoidal wave is formed upon receipt of the first pulse, the rear inclined portion of the trapezoidal wave is formed upon receipt of the second pulse and the portions other than the inclined portions thereof are flattened, and outputs the signal as the drive signal; and wherein said trapezoidal wave generating circuit includes a constant current circuit, a switching circuit and a capacitor, said capacitor is charged from said constant current circuit said switching circuit in response to the first pulse, and said capacitor is discharged from said constant current circuit via said switching circuit in response to the second pulse.

* * * * *